3,585,692
SAFETY BELT BUCKLES
Noel le Mire, Billancourt, France, assignor to Regie
Nationale des Usines Renault, Billancourt, and Automobiles Peugeot, Paris, France
Filed July 30, 1969, Ser. No. 846,125
Claims priority, application France, Aug. 1, 1968,
161,497
Int. Cl. A44b *11/25, 17/00*
U.S. Cl. 24—230          4 Claims

ABSTRACT OF THE DISCLOSURE

A safety belt buckle for automobile or aircraft use, of the type comprising on the one hand an anchoring member engageable by a U-shaped abutment member or eyelet and on the other hand a member movable in two opposite directions with respect to said anchoring member normally urged to its latching position by a spring. The movable member is adapted to be brought against the resistance of said spring to an opening position for releasing or engaging said abutment member. The anchoring member comprises two pivotally mounted retaining arms adapted to co-act with said movable member constituting a socket or the like, irrespective of its position in relation to said anchoring member.

---

Figure 1:
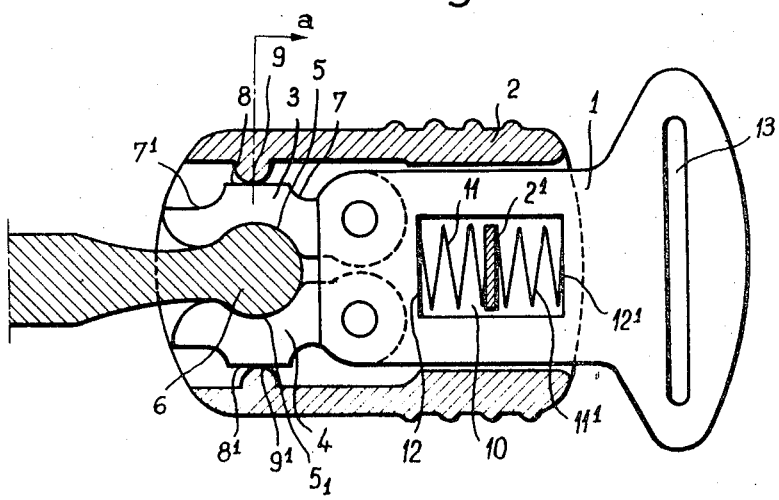

The present invention is concerned with buckles for safety or seat belts, or the like, which comprises an anchoring member adapted to be engaged by an abutment member fastened to a body element in the passenger compartment of a vehicle. Safety belt buckles are already known which comprise a plate- or socket-shaped body movable unidirectionally against the resistance of a spring and slidable on a flat member provided at one end with belt-fastening means and at the opposite end with hook means adapted to be guided for engaging and retaining said abutment member. Buckles of this type permit a quick release of the abutment member by simply pulling the socket. However, the hook means cannot be brought into coupling engagement with said abutment member unless they are preliminarily released. This hook release movement takes place in the same direction as the belt release movement and requires therefore a certain adaptation or skill from the wearer. Devices involving the quick unlatching of a link or eyelet are also known which comprise a pawl pivoted to a pin rigid with a fixed element enclosed in a case movable in two opposite directions. These known devices are objectionable because they do not permit the safe latching of the link unless the pawl is manually retained or held in its open or release position.

The present invention is also concerned with the provision of a buckle which is of particularly simple design and permits a quick fastening and unlatching thereof without having the inconveniences set forth hereinabove.

To this end, the buckle according to this invention, which is of the type comprising an anchoring member engageable by a substantially U-shaped abutment member or eyelet, comprises a socket-forming member movable in two opposite directions with respect to said anchoring member normally held in its latching position by a spring, and wherein said movable member is adapted to be moved against the resistance of said spring to an open position for releasing or engaging said abutment member, is characterized in that the anchoring member comprises a pair of pivoted retaining members adapted to co-act with the movable member or socket, irrespective of its position in relation to said anchoring member.

The buckle thus constructed may be used without exerting any particular care since the latching engagement is obtained by pushing quite naturally the movable socket-forming member against the abutment member or eyelet, the releasing action resulting on the other hand from a likewise natural traction exerted on said socket-forming member.

Figure 2:
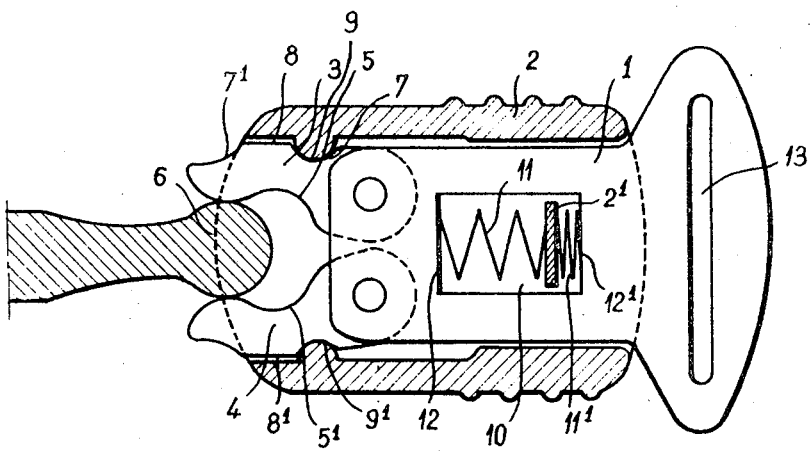

Other features characterizing this invention will appear as the following description proceeds with reference to the accompanying drawing illustrating diagrammatically by way of example a typical and exemplary form of embodiment of the buckle according to this invention. In the drawing:

FIG. 1 is an axial section showing the buckle in its latched or fastened position, and FIG. 2 is a similar view showing the buckle in its unlatched or release position.

Referring first to FIG. 1, it will be seen that the safety belt buckle illustrated comprises an anchoring member 1 disposed within a socket or sheath 2 movable on said member 1, the latter being suitably guided in the former. The anchoring member 1 consists of a parallel-edged plate provided at one end with a pair of retaining arms 3, 4 pivoted about corresponding pins carried by said plate 1. The arms 3, 4 have symmetrically registering and opposite contours 5, 5¹ designed for retaining the head of the abutment member 6 and fitting thereto. The arms 3, 4 are also each provided with external notches 7, 7¹ separated by an intermediate flat portion 8, 8¹ co-acting in the latching position (FIG. 1) with internal bosses or like projections 9, 9¹ carried by the socket 2. This socket 2 further carries a rigid transverse lug or like element 2¹, and the sliding plate 1 has formed therein a rectangular aperture 10 through which said lug 2¹ projects or extends. Spring means 11, 11¹ disposed in said aperture 10 on either side of lug 2¹ react with one end against said lug 2¹ and with the other end against the edges 12 and 12¹ of said aperture 10. The socket 2 may advantageously consist of two parts assembled by means of rivets after having disposed the member 1 and springs 11, 11¹ in said socket. The end of plate 1 which emerges from socket 2, i.e. the end opposite to the one carrying the pivoted arms 3, 4, is somewhat widened and slotted to permit the fixing of a webbing or belt to be fastened, in the case of a car safety belt, to the vehicle body.

This safety buckle operates as follows:

To bring the buckle to the position permitting releasing the member 6, the wearer moves the socket 2 in the direction of the arrow *a*. Then the various component elements assume the positions shown in FIG. 2 illustrating the buckle in its release condition, wherein the internal bosses or like projections 9, 9¹ of the socket engage the innermost notches 7 of arms 3, 4, and the spring 11¹ is compressed while the other spring 11 is allowed to expand. The fastening of this buckle by causing the arms 3, 4 to clamp the member 6 is obtained very normally by naturally pushing the socket or sheath 2 against the member 6; the socket 2 is moved in the direction opposite to the arrow *a* from the position shown in FIG. 1 thus compressing spring 11 and tensioning spring 11¹; thus, the bosses 9, 9¹ engage the other notches 7¹ of arms 3, 4 and the outer ends of these arms can thus move away from each other to permit the insertion of the head of member 6 therebetween, whereafter the socket 2 is released, the bosses 9, 9¹ re-engaging the flat intermediate portions 8, 8¹ of arms 3, 4, whereby these arms are moved again towards each other so as to clamp with their intermediate inner portions the head of the previously engaged abutment member 6, the clamping action of these arms 3, 4 being safely maintained subsequently by the action of springs 11 and 11¹ resuming their normal expanded position shown in FIG. 1.

It will be seen that the bosses 9, 9¹ formed inside the socket 2 co-act with the rectilinear or flat intermediate portion of arms 3, 4 and with each notch 7, 7¹ thereof according to the direction of the movement impressed to the movable socket.

What is claimed as new is:

1. A buckle for safety belts of the type used in automobiles, aircraft and the like comprising an anchoring member and an abutment member, said anchoring member comprising a plate, a pair of retaining arms pivotally mounted on one end of said plate, each arm having two longitudinally spaced notches separated by an intermediate portion along its outer edges, and a sheath movable along said plate and having a boss on the surfaces of a pair of opposite walls engageable with said notches and intermediate portion, said sheath being adapted to coact with said arms to release said abutment member when said bosses engage said notches and clamp said abutment member when said bosses engage said intermediate portion.

2. A buckle according to claim 1 further comprising spring means acting between said plate and said sheath to bias the latter towards its said intermediate position.

3. A buckle according to claim 1 further comprising an aperture formed in said plate, lug means connected to said sheath and passing through said aperture, spring means acting between said plate and said lug to bias said sheath towards its intermediate position.

4. A buckle according to claim 1 further comprising means on said anchoring member and on said abutment member for fastening belt segments thereto.

References Cited

UNITED STATES PATENTS

| | | | |
|---|---|---|---|
| 227,793 | 5/1880 | Kingston | 24—251X |
| 598,959 | 2/1898 | Richardson | 24—241 |
| 737,068 | 8/1903 | Briel | 24—230.1—TUX |
| 2,299,371 | 10/1942 | Allen | 24—251 |
| 3,171,183 | 3/1965 | Johnston | 24—230.1—TUX |
| 3,357,126 | 12/1967 | Klieves | 24—251X |

FOREIGN PATENTS

| | | | |
|---|---|---|---|
| 446,016 | 1/1948 | Canada | 24—211M |

BERNARD A. GELAK, Primary Examiner

U.S. Cl. X.R.

24—211